United States Patent
Kamimura et al.

(10) Patent No.: US 12,305,082 B2
(45) Date of Patent: May 20, 2025

(54) CURABLE-TYPE COMPOSITION, TWO-COMPONENT CURABLE-TYPE COMPOSITION SET, AND METHOD OF PRODUCING ADHERED PRODUCT

(71) Applicant: TOAGOSEI CO., LTD., Tokyo (JP)

(72) Inventors: Hiroyuki Kamimura, Nagoya (JP); Kento Oomura, Nagoya (JP); Michihiro Kaai, Nagoya (JP)

(73) Assignee: TOAGOSEI CO., LTD.

( * ) Notice: Subject to any disclaimer, the term of this patent is extended or adjusted under 35 U.S.C. 154(b) by 603 days.

(21) Appl. No.: 17/640,169

(22) PCT Filed: Sep. 10, 2020

(86) PCT No.: PCT/JP2020/034365
§ 371 (c)(1),
(2) Date: Mar. 3, 2022

(87) PCT Pub. No.: WO2021/049590
PCT Pub. Date: Mar. 18, 2021

(65) Prior Publication Data
US 2022/0282135 A1  Sep. 8, 2022

(30) Foreign Application Priority Data
Sep. 10, 2019  (JP) ................................. 2019-164835

(51) Int. Cl.
*C08F 2/46*    (2006.01)
*C08F 2/50*    (2006.01)
*C08F 122/10*  (2006.01)
*C08G 61/04*   (2006.01)
*C09J 135/02*  (2006.01)

(52) U.S. Cl.
CPC ........... *C09J 135/02* (2013.01); *C08F 122/10* (2013.01)

(58) Field of Classification Search
CPC ..... C09J 5/04; C09J 5/00; C09J 135/02; C09J 4/00; C09J 11/06; C08F 2/50; C08F 122/10; C08F 122/16
USPC ................ 522/65, 6, 189, 184, 71, 1; 520/1
See application file for complete search history.

(56) References Cited

U.S. PATENT DOCUMENTS

| | | | |
|---|---|---|---|
| 2014/0045965 A1* | 2/2014 | Noguchi | C08F 222/103 522/182 |
| 2015/0073110 A1 | 3/2015 | Molofsky et al. | |
| 2018/0094115 A1* | 4/2018 | Martz | C08K 5/092 |
| 2020/0190335 A1 | 6/2020 | Deshpande et al. | |
| 2021/0070893 A1* | 3/2021 | Arimitsu | C09D 11/101 |
| 2022/0380615 A1* | 12/2022 | Kaai | C09D 11/40 |
| 2023/0002642 A1* | 1/2023 | Kaai | C08F 22/14 |

FOREIGN PATENT DOCUMENTS

| | | | |
|---|---|---|---|
| JP | 2014503474 | | 2/2014 |
| JP | 2015512460 | | 4/2015 |
| JP | 2017036361 | * | 2/2017 |
| JP | 2017036361 A | * | 2/2017 |
| WO | WO2018022810 | | 2/2018 |
| WO | WO2018212330 | | 11/2018 |
| WO | WO2019116931 | | 6/2019 |

OTHER PUBLICATIONS

Yamazaki npl, A Lewiis acid-promoted cyclization of ethenetricarboxylate derivative aromatic compounds. Novel syntheses of oxindoles and benzofuranones via FriedelCrafts intramolecular Michael Addition, 2004, Org. Biomol. Chem., 2, 3134-3138 (Year: 2004).*
Motofuji et al, JP 2017036361 Machine Translation, Feb. 16, 2017 (Year: 2017).*
PCT International Search Report (w/ English translation) and Written Opinion for corresponding PCT Application No. PCT/JP2020/034365, mailed on Dec. 1, 2020, 8 pages.
Klemarczyck, "A general synthesis of 1,1 disubstituted electron deficient olefins and their polymer properties", Polymer, 1998, vol. 39, No. 1, pp. 173-181.
Tachibana et al., "Regional Density Functional Theory for the Initiation Reaction of Anionic Polymerization", J. Am. Chem. Soc., 1995, vol. 117, pp. 3605-3610.

\* cited by examiner

*Primary Examiner* — Jessica Whiteley
(74) *Attorney, Agent, or Firm* — Dority & Manning, P.A.

(57) ABSTRACT

Provided is a curable-type composition, including a methylene malonate compound, a Lewis acidic compound, and a photo base generator.

17 Claims, No Drawings

CURABLE-TYPE COMPOSITION, TWO-COMPONENT CURABLE-TYPE COMPOSITION SET, AND METHOD OF PRODUCING ADHERED PRODUCT

CROSS-REFERENCE TO RELATED APPLICATIONS

The present application is related and has right of priority to JP 2019-164835, which was filed on Sep. 10, 2019 in the Japanese Patent Office, and is a U.S. national phase entry of PCT/JP2020/034365, which was filed on Sep. 10, 2020, both of which are incorporated by reference in their entireties for all purposes.

TECHNICAL FIELD

The present invention relates to a curable-type composition, a two-component curable-type composition set, and a method of producing an adhered product.

BACKGROUND ART

Curable-type compositions are widely used in applications such as adhesives, coatings, sealants, and excipients. Polymerization reactions using curable-type compositions are classified into three types, i.e., radical polymerization, cationic polymerization, and anionic polymerization, depending on active species that are generated during the polymerization.

As anionic polymerizable monomers, cyanoacrylate compounds such as 2-ethyl cyanoacrylate and methylene malonate compounds such as diethyl methylene, malonate are known.

It is known that cyanoacrylate compounds are rapidly polymerized with weak bases such as water.

On the other hand, in Non-Patent Document 1, it is predicted that dialkylmethylene malonate compounds do not exhibit anionic polymerizability with weak bases such as water, unlike cyanoacrylate compounds. In the studies by the present inventors, methylene malonate compounds did not actually exhibit anionic polymerizability with weak bases such as water.

In Non-Patent Document 2, a result of thermogravimetric analysis of a 2-ethyl cyanoacrylate homopolymer and a di ethylmethylene malonate homopolymer is shown. It has been reported that, while the 2-ethyl cyanoacrylate homopolymer exhibits weight loss due to decomposition at less than 200° C., the diethylmethylene malonate homopolymer exhibits almost no weight loss even at 250° C. and is excellent in heat resistance. Therefore, if curability of methylene malonate compounds can be improved, it is expected that they can be applied to various applications as materials that are excellent in heat resistance.

In Patent Document 1, a curing method of a 1,1-dialkoxycarbonylethylene (methylenemalonate) is shown, and a curing method using a specific basic compound as an activator for the compound is studied.

Further, studies on applying anionic polymerizable monomers to photocurable-type compositions have been made, In Patent Document 1, ultraviolet curing of a composition including a methylene malonate compound and a photopolymerization initiator that uses an acylphosphine oxide and a metallocene in combination is studied. However, it is described that ultraviolet curing does not take place by using only the methylene malonate compound, and ultraviolet curing takes place by using it with a cyanoacrylate compound in combination.

In Patent Document 2, an ion pair-type photo base generator that consists of an anion and a compound that has a substituent group having a canonized amidine skeleton is described, and photocuring of a methylene malonate compound is studied.

PRIOR ART DOCUMENT

Non-Patent Document

Non-Patent Document 1: J. Am. Chem. Soc., vol. 117, pp 3605 to 3610, 1995
Non-Patent Document 2: Polymer, vol. 39, No.1, pp 173 to 181, 1998.

Patent Document

Patent Document 1: Japanese National Phase Publication (JP-A) No. 2015-512460
Patent Document 2: Japanese Patent Application Laid-Open (JP-A) No. 2017-036361

SUMMARY OF INVENTION

Technical Problem

By the way, in the technical fields such as adhesives and sealants, so-called dual curable-type compositions have been studied in which, after base materials are affixed with curable-type compositions, a part through which light is transmitted is cured by light such as ultraviolet rays, and a part through which light is not transmitted (dark part) is cured by another curing mechanism.

In the case of applying a methylene malonate compound that is an anionic polymerizable monomer to a dual curable-type composition, as described above, a usage example as a photocurable-type composition is known. However, the dialkylmethylene malonate compound is difficult to be cured with a weak base and the activator described in Patent Document 1 may be insufficient in curability, resulting in insufficient dark part curability.

An object to be solved by the present invention is to provide a curable-type composition capable of photocuring and dark part curing, or a method of producing an adhered product using the curable-type composition.

Another object to be solved by the present invention is to provide a two-component curable-type composition set capable of photocuring and dark part curing, or a method of producing an adhered product using the two-component curable-type composition set.

Solution to Problem

Means for solving the problem described above includes the following aspects.

<1> A curable-type composition, including: a methylene malonate compound; a Lewis acidic compound; and a photo base generator, <2> The curable-type composition according to <1>, in which the methylene malonate compound is a compound represented by the following Formula (1) or Formula (2).

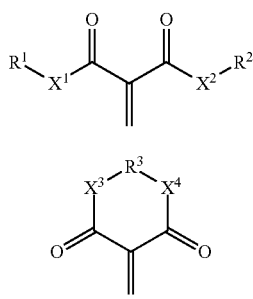

In Formula (1) and Formula (2), each of $X^1$ to $X^2$ independently represents O, NR, or $C(R)_2$, in which each R independently represents a hydrogen atom, an alkyl group, or an aryl group, $R^1$ and $R^2$ each independently represent an alkyl group or an aryl group, and $R^3$ represents an alkylene group, an arylene group, or a group that is a combination of two or more thereof.

<3> The curable-type composition according to <1> or <2>, in which the Lewis acidic compound includes a Lewis acidic compound having a metal cation.

<4> The curable-type composition according to any one of <1> to <3>, in which the Lewis acidic compound includes a Lewis acidic compound having at least one metal cation selected from the group consisting of $Fe^{2+}$, $Cu^{2+}$, $Zn^{2+}$, $Ag^+$, $Yb^{3+}$, and $Ti^{4+}$.

<5> The curable-type composition according to any one of <1> to <4>, in which the Lewis acidic compound includes a Lewis acidic compound having at least one counter anion selected from the group consisting of a trifluoromethanesulfonic anion, a tert-butoxide anion, an acetylacetonate anion, a chloride ion, and a bromide ion.

<6> The curable-type composition according to any one of <1> to <5>, in which a content of the Lewis acidic compound is from 0.001 parts by mass to 1.0 part by mass with respect to a content of the methylene malonate compound of 100 parts by mass.

<7> The curable-type composition according to any one of <1> to <6>, in which each of $X^1$ to $X^4$ independently represents O or NR.

<8> The curable-type composition according to any one of <1> to <7>, in which each of $X^1$ to $X^4$ represents O.

<9> The curable-type composition according to any one of <1> to <8>, in which $R^1$ and $R^2$ e each independently represent an alkyl group.

<10> The curable-type composition according to any one of <1> to <9>, in which $R^3$ represents an alkylene group.

<11> The curable-type composition according to any one of <1> to <10>, the composition including the compound represented by Formula (1).

<12> The curable-type composition according to any one of <1> to <11>, in which the photo base generator includes a compound that generates an amine compound in response to light.

<13> A method of producing an adhered product, the method including: a step of applying the curable-type composition according to any one of <1> to <12> to a surface of a first adherend; a step of affixing the surface of the first adherend, to which the curable-type composition has been applied, to a second adherend; and a step of irradiating the curable-type composition between the first adherend and the second adherend with light from a side of an adherend having light transparency, in which at least one of the first adherend or the second adherend is the adherend having light transparency.

<14> A two-component curable-type composition set, including: a composition A that includes a methylene malonate compound and a photo base generator; and a composition B that includes a Lewis acidic compound.

<15> The two-component curable-type composition set according to <14>, in which the methylene malonate compound is a compound represented by the following Formula (1) or Formula (2).

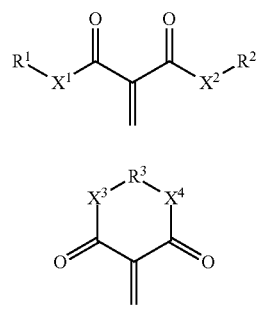

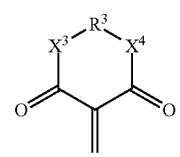

In Formula (1) and Formula (2), each of $X^1$ to $X^4$ independently represents O, NR, or $C(R)_2$, in which each R independently represents a hydrogen atom, an alkyl group, or an aryl group, $R^1$ and $R^2$ each independently represent an alkyl group or an aryl group, and $R^3$ represents an alkylene group, an arylene group, or a group that is a combination of two or more thereof.

<16> A method of producing an adhered product, the method including: a step of applying a composition B that includes a Lewis acidic compound to a surface of a first adherend: a step of applying a composition A that includes a methylene malonate compound and a photo base generator, to the surface of the first adherend or a surface of a second adherend; a step of affixing the surface of the first adherend to which the composition B has been applied, to the surface of the second adherend to which the composition A has been applied, or affixing the surface of the first adherend to which the composition A and the composition B have been applied, to the surface of the second adherend; and a step of irradiating the curable-type composition between the first adherend and the second adherend with light from a side of an adherend having light transparency, in which at least one of the first adherend or the second adherend is the adherend having light transparency.

<17> The method of producing an adhered product according to <16>, in which the methylene malonate compound is a compound represented by the following Formula (1) or Formula (2).

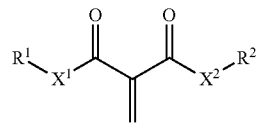

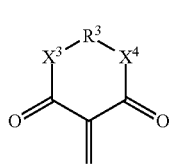
(2)

In Formula (1) and Formula (2), each of $X^1$ to $X^4$ independently represents O, NR, or $C(R)_2$, in which each R independently represents a hydrogen atom, an alkyl group, or an aryl group, $R^1$ and $R^2$ each independently represent an alkyl group or an aryl group, and $R^3$ represents an alkylene group, an arylene group, or a group that is a combination of two or more thereof.

Advantageous Effects of Invention

According to the present invention, it is possible to provide a curable-type composition capable of photocuring and dark part curing, or a method of producing an adhered product using the curable-type composition.

Further, according to the present invention, it is possible to provide a two-component curable-type composition set capable of photocuring and dark part curing, and a method of producing an adhered product using the two-component curable-type composition set.

DESCRIPTION OF EMBODIMENTS

The explanation of constituent elements described below may be made based on representative embodiments of the present invention, but the present invention is not limited to such embodiments. Herein, the range "(from) X to Y" is used to mean a range that includes the numerical values X and Y described before and after "to" as the lower limit value and the upper limit value, respectively.

In the numerical range described stepwise herein, the upper limit value or the lower limit value described in one numerical range may be replaced with the upper limit value or the lower limit value of another numerical range described stepwise. Further, in the numerical range described herein, the upper limit value or the lower limit value of the numerical range may be replaced with the value indicated in the examples.

In the present invention, the amount of each component in the composition means, When multiple substances corresponding to each component are present in the composition, the total amount of the multiple substances that are present in the composition, unless otherwise specified.

In the present invention, the term "step" includes not only an independent step, but also a step that is not clearly distinguished from another step but that achieves the intended purpose of the step.

In the present invention, "% by mass" and "% by weight" are synonymous, and "parts by mass" and "parts by weight" are synonymous.

Further, in the present invention, the combination of two or more preferable embodiments is a more preferable embodiment.

Further, "(meth)acryloyl" herein represents both acryloyl and methacryloyl or either of them, and "(meth)acryloxy" herein represents both acryloxy and methacryloxy or either of them.

Furthermore, in some of the compounds herein, the hydrocarbon chain may be expressed by a simplified structural formula that omits the symbols of carbon (C) and hydrogen (H).

In the present invention, "applying (application)" means operating so that at least a part of the curable-type composition comes into contact with a surface of the adherend, or operating so that at least a part of the composition A and/or the composition B comes into contact with a surface of the adherend.

Specific examples can include covering a part or all of a surface of the adherend with the curable-type composition or with at least one of the composition A or the composition B, by coating, filling, or other means.

Hereinafter, the contents of the present invention will be described in detail.

Curable-Type Composition

The curable-type composition of the present invention includes a methylene malonate compound, a Lewis acidic compound, and a photo base generator.

For example, as to a conventional curable-type composition including a methylene malonate compound, only a method of curing it with a polymerization initiator or mixing a basic compound immediately before curing as in the invention described in Patent Document 1 was known.

As a result of intense studies, the present inventors have found that configuring a curable-type composition that includes a methylene malonate compound, a Lewis acidic compound, and a photo base generator enables curing by light as well as dark part curing by moisture in the air.

Although the specific reaction mechanism is not clear, it is assumed that inclusion of the photo base generator enables photocuring by a base that is generated in response to light irradiation, and coordination of the Lewis acidic compound to the oxygen atom(s) of one or two carbonyl groups of the methylene malonate compound enhances anion polymerization activity of the methylene malonate compound, resulting in that anion polymerization becomes possible even by moisture in the air.

In particular, it is not known at all that a methylene malonate compound is anionically polymerized by moisture in the air, and a curable-type composition that enables photocuring and dark part curing of the methylene malonate compound has been found for the first time.

Further, since the curable-type composition of the present invention is capable of both photocuring and dark part curing by being configured as above, it is also excellent in internal curability and also excellent in thick film curability.

Hereinafter, the present invention will be described in detail.

Methylene Malonate Compound

The curable-type composition of the present invention includes a methylene malonate compound.

The methylene malonate compound is a compound having a —CO—C(=CH$_2$)—CO-structure, as also indicated in the following Formula (1) or Formula (2).

Among them, the methylene malonate compound is preferably a compound represented by the following Formula (1) or Formula (2), and more preferably a methylene malonate compound represented by the following Formula (1), from the viewpoint of reaction rate and storage stability.

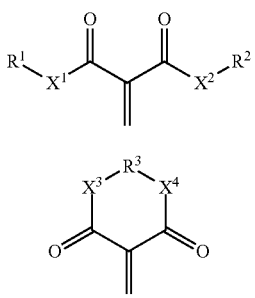

In Formula (1) and Formula (2), each of $X^1$ to $X^4$ independently represents O, NR, or $C(R)_2$, each R independently represents a hydrogen atom, an alkyl group, or an amyl group, $R^1$ and $R^2$ each independently represent an alkyl group or an aryl group, and $R^3$ represents an alkylene group, an arylene group, or a group that is a combination of two or more thereof.

Each of $X^1$ to $X^4$ in Formula (1) and Formula (2) is independently preferably O or NR, more preferably O or NH, and particularly preferably O, from the viewpoint of heat resistance, reaction rate, and storage stability.

$X^1$ and $X^2$ in Formula (1) are preferably the same group as each other, from the viewpoint of heat resistance, reaction rate, and storage stability.

Further, $X^1$ and $X^4$ in Formula (2) are preferably the same group as each other, from the viewpoint of heat resistance, reaction rate, and storage stability.

Each R in Formula (1) and Formula (2) is independently preferably a hydrogen atom, an alkyl group having 1 to 20 carbon atoms (also referred to as "the number of carbon atoms"), or an aryl group having 6 to 20 carbon atoms, more preferably a hydrogen atom, an alkyl group having 1 to 10 carbon atoms, or a phenyl group, further preferably a hydrogen atom or an alkyl group having 1 to 6 carbon atoms, and particularly preferably a hydrogen atom.

Accordingly, NR is particularly preferably NH, and $C(R)_2$ is particularly preferably $CH_2$.

Each of $R^1$ and $R^2$ in Formula (1) is independently preferably an alkyl group having to 20 carbon atoms or an aryl group having 6 to 20 carbon atoms, more preferably an alkyl group having 1 to 20 carbon atoms, further preferably an alkyl group having 1 to 10 carbon atoms, particularly preferably an alkyl group having 1 to 3 carbon atoms, and most preferably a methyl group or an ethyl group, from the viewpoint of heat resistance, reaction rate, and storage stability.

Further, each of $R^1$ and $R^2$ in Formula (1) is independently preferably an alkyl group, from the viewpoint of heat resistance, reaction rate, and storage stability.

Further, $R^1$ and $R^2$ in Formula (1) are preferably the same group as each other, from the viewpoint of heat resistance, reaction rate, and storage stability.

$R^3$ in Formula (2) is preferably an alkylene group having 1 to 20 carbon atoms, an arylene group having 6 to 20 carbon atoms, or a group having 7 to 20 carbon atoms, the group being a combination of one or more alkylene groups and one or more arylene group, more preferably an alkylene group having 1 to 20 carbon atoms, further preferably an alkylene group having 1 to 10 carbon atoms, and particularly preferably a methylene group, an ethylene group, or a dimethylmethylene group, from the viewpoint of reaction rate.

Further, $R^3$ in Formula (2) is preferably an alkylene group, from the viewpoint of reaction rate.

The alkyl group or the alkylene group of each group in Formula (1) and Formula (2) may be linear, may be branched, may have a ring structure, or may have a substituent group.

Examples of the substituent group that the alkyl group or the alkylene group may have include an aryl group, an alkoxy group, an alkoxycarbonyl group, and an acyl group.

The aryl group or the arylene group of each group in Formula (1) and Formula (2) may have a substituent group.

Examples of the substituent group that the aryl group or the arylene group may have include an alkyl group, an aryl group, an alkoxy group, an alkoxycarbonyl group, and an acyl group.

Preferred specific examples of the methylene malonate compound represented by Formula (1) include a dialkyl 2-methylene malonate, such as dimethyl 2-methylene malonate, diethyl 2-methylene malonate, dibutyl 2-methylene malonate, 1-methyl-3-hexyl 2-methylene malonate, and dicyclohexyl 2-methylene malonate.

Among them, examples particularly preferably include diethyl 2-methylene malonate.

Preferred specific examples of the methylene malonate compound represented by Formula (2) include a 5-methylene-1,3-dioxane-4,6-dione compound, such as 5-methylene-1,3-dioxane-4,6-dione and 2,2-di methyl-5-methylene-1,3-dioxane-4,6-dione.

The curable-type composition of the present invention may include one of the methylene malonate compound singly, or two or more thereof.

The content of the methylene malonate compound in the curable-type composition of the present invention is preferably from 10% by mass to 99.9% by mass, more preferably from 30% by mass to 99.5% by mass, further preferably from 50% by mass to 99.5% by mass, and particularly preferably from 90% by mass to 99% by mass, with respect to the total solid content of the curable-type composition.

In the present specification, the "total solid content" refers to a total mass of components that are obtained by excluding a solvent from all components of the composition. Further, the "solid content" is a component from which a solvent has been excluded as described above, and may be, for example, a solid or a liquid at 25° C.

Lewis Acidic Compound

The curable-type composition of the present invention includes a Lewis acidic compound.

The Lewis acidic compound used for the present invention is preferably a Lewis acidic compound capable of acting on, for example, coordinating to the methylene malonate compound.

The Lewis acidic compound preferably includes a Lewis acidic compound having a metal cation, more preferably a Lewis acidic compound having a monovalent to tetravalent metal cation, and particularly preferably a Lewis acidic compound having a monovalent to trivalent metal cation, from the viewpoint of curing rate and storage stability.

The metal cation is preferably a group 3 to 12 metal cation, further preferably at least one metal cation selected from the group consisting of $Fe^{2+}$, $Cu^{2+}$, $Zn^{2+}$, $Ag^+$, $Yb^{3+}$, $Ti^{4+}$, $Zr^{4+}$, $Hf^{4+}$, $In^{3+}$, $Au^+$, $Sn^{4+}$, $Cd^{2+}$, $Ni^{2+}$, $Mn^{2+}$, $Co^{2+}$, $Cr^{2+}$, and $Ga^{2+}$, particularly preferably at least one metal cation selected from the group consisting of $Fe^{2+}$, $Cu^{2+}$, $Zn^{2+}$, $Ag^+$, $Yb^{3+}$, and $Ti^{4+}$, and most preferably at least one metal cation selected from the group consisting of $Cu^{2+}$, $Zn^{2+}$, and $Ag^+$, from the viewpoint of curing rate and storage stability.

The Lewis acidic compound is preferably a salt of a metal cation and a counter anion, from the viewpoint of curing rate and storage stability.

Further, the Lewis acidic compound preferably includes a Lewis acidic compound that has at least one counter anion selected from the group consisting of a sulfonate ion, a hypochlorite ion, a 1,3-diketonate anion, an alkoxide anion, and a halide ion, more preferably includes a Lewis acidic compound that has at least one counter anion selected from the group consisting of a trifluoromethanesulfonic acid anion, a methanesulfonic acid anion, a tosic acid anion, a benzenesulfonic acid anion, a hypochlorous acid anion, a tert-butoxide anion, an acetylacetonate anion, a chloride ion, and a bromide ion, further preferably includes a Lewis acidic compound that has at least one counter anion selected from the group consisting of a trifluoromethanesulfonic acid anion, a methanesulfonic acid anion, a tert-butoxide anion, an acetylacetonate anion, a chloride ion, and a bromide ion, and particularly preferably includes a Lewis acidic compound that has a trifluoromethanesulfonic acid anion, from the viewpoint of curing rate and storage stability.

Specific examples of the Lewis acidic compound include copper (II) trifluoromethanesulfonate, zinc (II) trifluoromethanesulfonate, silver (I) trifluoromethanesulfonate, itterbium (III) trifluoromethanesulfonate, titanium (IV) butoxide, titanium (IV) tert-butoxide, copper (II) chloride, copper (II) bromide, zinc (II) chloride, and zinc (II) bromide.

Among them, copper (II) trifluoromethanesulfonate, zinc (II) trifluoromethanesulfonate, silver (I) trifluoromethanesulfonate, or itterbium (III) trifluoromethanesulfonate (III) is more preferable, and copper (II) trifluoromethanesulfonate, zinc (II) trifluoromethanesulfonate, or silver (I) trifluoromethanesulfonate is particularly preferable, from the viewpoint of curing rate and storage stability.

The curable-type composition of the present invention may include one of the Lewis acidic compound singly, or two or more thereof.

The content of the Lewis acidic compound in the curable-type composition of the present invention is preferably from 0.001 parts by mass to 1.0 parts by mass, more preferably from 0.001 parts by mass to 0.5 parts by mass, and particularly preferably from 0.001 parts to 0.1 parts by mass, with respect to the content of the methylene malonate compound of 100 parts by mass.

Photo Base Generator

The curable-type composition of the present invention includes a photo base generator.

The photo base generator used for the present invention is not particularly limited, but is preferably a photo base generator that generates a Broenstead base in response to light, more preferably a photo base generator that generates an organic base in response to light, and particularly preferably a photo base generator that generates an amine compound in response to light.

The "light" in the present invention is an electromagnetic wave or radiation that can impart, by irradiation thereof, energy to generate an anion polymerization-initiating species (base) from the photo base generator in the curable-type composition, and encompasses α-rays, γ-rays, X-rays, ultraviolet rays, visible light, infrared rays, and the like.

Examples of the photo base generator include a compound having a carbamate group (urethane bond), a compound having an acyloxyimino group, an anion-cation complex, and a compound having a carbamoyloxyimino group, each of which is a compound that generates a base in response to light.

Examples of the photo base generator also include those described in JP-A No. 2015-087612, JP-A No. 2008-247747, International Publication No. 2010/064631, International Publication No. 2009/122664, JP-A No. 2015-28540, JP-A No. 2013-80206, and JP-A No. 2008-208342.

Commercially available photo base generators are not particularly limited, but WPBG series, i.e., "WPBG-082", "WPBG-167", "WPBG-168", "WPBG-018", "WPBG-027", "WPBG-140" manufactured by Fujifilm Wako Pure Chemical Industries, Ltd., and the like, can be used therefor.

As described above, the photo base generator is preferably a photo base generator that generates an amine compound in response to light, but among them, preferably includes a compound represented by the following Formula (Pb1) from the viewpoint of photocurability, photocuring rate, and thick film curability.

When the compound represented by the following Formula (Pb1) is irradiated with light, the aldehyde group and the carbonyl group of the amide group form a lactone ring, and the structure that contains the nitrogen atom of the amide group becomes an amino group, which results in production of an amine compound (base).

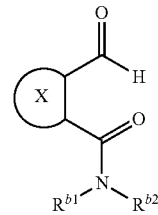

(Pb1)

In Formula (Pb1), the ring X represents an aromatic ring that may have a substituent group or a heteroaromatic ring that may have a substituent group, $R^{b1}$ and $R^{b2}$ each independently represent a hydrogen atom or an alkyl group, and $R^{b1}$ and $R^{b2}$ may be bonded. to each other to form a ring.

The ring X in Formula (Pb1) is preferably an aromatic ring that may have a substituent group.

Examples of the aromatic ring in the ring X include a monocyclic ring, and an aromatic ring in which two or more rings are condensed. Specific examples thereof include a benzene ring, a naphthalene ring, a phenanthrene ring, and an anthracene ring. Among them, a benzene ring is preferable.

Examples of the heteroaromatic ring in the ring X include a monocyclic ring, and a heteroaromatic ring in which two or more rings are condensed, the monocyclic ring and the heteroaromatic ring each containing at least one heteroatom selected from the group consisting of an oxygen atom, a nitrogen atom, and a sulfur atom. Specific examples thereof include a thiophene ring, a furan ring, a pyrrole ring, a pyridine ring, and a pyrazine ring.

The aromatic ring or the heteroaromatic ring in the ring X may have a substituent group. Examples of the substituent group include an alkyl group (for example, an alkyl group having 1 to 6 carbon atoms). The aromatic ring or the heteroaromatic ring may be substituted with 1 to 3 groups selected from the group consisting of these substituent groups.

It is preferable that $R^{b1}$ and $R^{b2}$ in Formula (Pb1) are each independently an alkyl group, or $R^{b1}$ and $R^{b2}$ are bonded to each other to form a ring.

Further, it is preferable that $R^{b1}$ and $R^{b2}$ are the same group as each other, or $R^{b1}$ and $R^{b2}$ are bonded to each other to form a ring.

Examples of the alkyl group include a linear or branched alkyl group, and preferred examples include an alkyl group having 1 to 20 carbon atoms. Specific examples include a methyl group, an ethyl group, an n-propyl group, an isopropyl group, an n-butyl group, a secbutyl group, a tert-butyl group, an isobutyl group, a pentyl group, a hexyl group, a heptyl group, an octyl group, a nonyl group, a decyl group, and a dodecyl group.

Among them, an alkyl group having 1 to 10 carbon atoms is preferable, an alkyl group having 1 to 6 carbon atoms is more preferable, an alkyl group having 1 to 3 carbon atoms is further preferable, and a methyl group or an ethyl group is particularly preferable.

Further, $R^{b1}$ and $R^{b2}$ in Formula (Pb1) may be bonded to each other to form a ring. Examples of the ring that is formed by $R^{b1}$ and $R^{b2}$ include a monocyclic ring, and a ring in which two or more rings are condensed. Examples thereof include an aziridine ring, an azetidine ring, a pyrrolidine ring, a piperidine ring, a morpholine ring, an imidazole ring, a pyrazole ring, and a 1,2,3,4-tetrahydroisoquinoline ring. Among them, a piperidine ring is preferable.

Further, the ring that is formed by $R^{b1}$ and $R^{b2}$ may have a substituent group. Examples of the substituent group include an alkyl group (for example, an alkyl group having 1 to 6 carbon atoms). The ring may be substituted with 1 to 6 groups selected from the group consisting of these substituent groups.

Preferred specific examples of the compound represented by Formula (Pb1) include a compound in which the ring X is a benzene ring, and $R^{b1}$ and $R^{b2}$ are each independently an alkyl group having 1 to 6 carbon atoms (more preferably, an alkyl group having 1 to 3 carbon atoms, and particularly preferably a methyl group or an ethyl group), or $R^{b1}$ and $R^{b2}$ are bonded to each other to form a piperidine ring or a pyrrolidine ring.

Further, those commercially available may be used for the compound represented by Formula (Pb1), or the compound represented by Formula (Pb1) may be produced by a known method. For example, it can be produced according to or in accordance with the description of J. Chem. Soc., Perkin-Trans. I, p344 to 348 and the like.

Examples of the compound that generates an amine compound in response to light include a carbamate compound in addition to the compound represented by Formula (Pb1).

Specific examples of the carbamate compound include 9-anthrylmethyl N, N-diethyl carbamate.

The curable-type composition of the present invention may include one of the photo base generator singly, or two or more thereof.

The content of the photo base generator in the curable-type composition of the present invention is preferably from 0.01% by mass to 30% by mass, more preferably from 0.1% by mass to 15% by mass, further preferably from 0.2% by mass to 10% by mass, and particularly preferably from 0.5% by mass to 5% by mass, with respect to the total solid content of the curable-type composition.

Polymerization Inhibitor

The curable-type composition of the present invention preferably includes a polymerization inhibitor, and more preferably includes a radical polymerization inhibitor, from the viewpoint of storage stability.

The polymerization inhibitor preferably includes a phenolic radical polymerization inhibitor from the viewpoint of storage stability. The phenolic radical polymerization inhibitor is preferably at least one selected from the group consisting of hydroquinone, mequinol, butylhydroxyanisole, di-tert-butylhydroxytoluene, methylhydroquinone, methoxyhydroquinone, 2,6-dimnethylhydroquinone, 2,6-di-tert-butylhydroquinone, 4-tert-butylcatechol, tert-butylhydroquinone, 6-tert-butyl-4-xylenol, 2,6-di-tert-butylphenol and 1,2,4-trihydroxybenzene. The phenolic radical polymerization inhibitor is particularly preferably at least one selected from the group consisting of hydroquinone, methylhydroquinone, methoxyhydroquinone, 2,6-dimethylhydroquinone and 2,6-di-tert-butylhydroquinone, each of which is a radical polymerization inhibitor that has a hydroquinone structure.

Further, preferred examples of the polymerization inhibitor also include an anionic polymerization inhibitor, such as diphosphorus pentoxide, $SO_2$, p-toluenesulfonic acid, methanesulfonic acid, propanesarton, and a $BF_3$ complex.

Further, it is also preferable to use, as the polymerization inhibitor, a radical polymerization inhibitor that has a hydroquinone structure and an anionic polymerization inhibitor in combination, from the viewpoint of storage stability.

From the viewpoint of storage stability, the polymerization inhibitor preferably includes a polymerization inhibitor that has a phenolic hydroxy group, is more preferably a compound represented by the following Formula (In1), and is particularly preferably a compound represented by the following Formula (In2).

Further, it is particularly preferable to use, as the polymerization inhibitor, a radical polymerization inhibitor that has a hydroquinone structure, an anionic polymerization inhibitor, and a polymerization inhibitor having a phenolic hydroxy group in combination, from the viewpoint of storage stability.

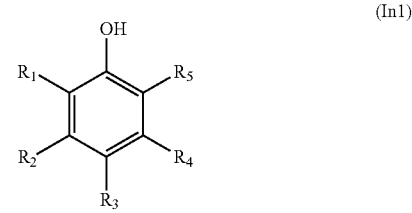

(In1)

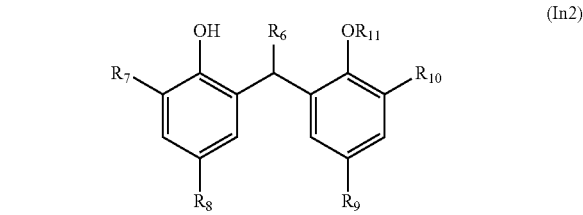

(In2)

In Formula (In1) and Formula (In2), each of $R_1$ to $R_5$ independently represents a hydrogen atom or a substituent group that may be bonded to each other to form a ring, the substituent group being other than a hydroxy group (provided that a phenolic hydroxy group is excluded), $R_6$ represents a hydrogen atom or an alkyl group, each of $R_7$ to $R_{10}$ independently represents an alkyl group, a cycloalkyl group, or an alkenyl group, and $R_{11}$ represents a hydrogen atom or a (meth)acryloyl group.

In Formula (In1), from the viewpoint of storage stability, it is preferable that at least one of $R_1$, $R_2$, $R_3$, $R_4$, or $R_5$ is the substituent group described above, it is more preferable that each of $R_1$ and $R_5$ is the substituent group described above, and it is particularly preferable that each of $R_1$, $R_3$ and $R_5$ is the substituent group described above.

It is preferable that $R_1$ and $R_5$ in Formula (In1) are each independently a linear or branched alkyl group, a cycloalkyl group, an alkyl group having a structure that has a phenolic hydroxy group, or an alkyl group having a (meth)acryloxy phenyl structure, more preferable that $R_1$ is a linear or branched alkyl group and $R_5$ is an alkyl group having a structure that has a phenolic hydroxy group or an alkyl group having a (meth)acryloxy phenyl structure, and particularly preferable that $R_1$ is a linear or branched alkyl group and $R_5$ is an alkyl group having a (meth)acryloxy phenyl structure, from the viewpoint of storage stability.

$R_3$ in Formula (In1) is preferably a hydrogen atom, an alkyl group, or an alkoxy group, more preferably a linear or branched alkyl group, a cycloalkyl group, or an alkoxy group, and further preferably a linear or branched alkyl group or an alkoxy group, from the viewpoint of storage stability.

The alkyl group in $R_1$, $R_3$ and $R_5$ is preferably an alkyl group having 1 to 8 carbon atoms, more preferably an alkyl group having 1 to 6 carbon atoms, further preferably a linear or branched alkyl group having 1 to 6 carbon atoms, a cycloalkyl group having 1 to 6 carbon atoms, a t-butyl group, or a 2-methyl-2-butyl group, and particularly preferably a methyl group, a t-butyl group, or a 2-methyl-2-butyl group.

The alkyl group may be linear, may be branched, may have a ring structure, or may have a substituent group.

The substituent group may be a group that does not impair polymerization inhibitory ability, and examples thereof include a halogen atom, an alkoxy group, and an aryl group. The substituent group may be further substituted with at least one group selected from the group consisting of the substituent group and the alkyl group described above.

In Formula (In1), each of $R_2$ and $R_4$ is independently preferably a hydrogen atom or an alkyl group, and more preferably a hydrogen atom.

$R_6$ in Formula (In2) is preferably a hydrogen atom or an alkyl group having 1 to 8 carbon atoms, and more preferably a hydrogen atom or a methyl group, from the viewpoint of storage stability.

Each of $R_7$ and $R_{10}$ in Formula (In2) is preferably a tertiary alkyl group, more preferably a tertiary alkyl group having 4 to 8 carbon atoms, and particularly preferably a t-butyl group or 2-methyl-2-butyl group, from the viewpoint of storage stability.

Each of $R_8$ and $R_9$ in Formula (In2) is preferably an alkyl group having 1 to 8 carbon atoms, and more preferably a methyl group, a t-butyl group, a 2-methyl-2-butyl group, a methoxy group, an ethoxy group, a propoxy group, or a butoxy group, from the viewpoint of storage stability.

$R_{11}$ in Formula (In2) is preferably a hydrogen atom or a (meth)acryloyl group, from the viewpoint of storage stability.

Among them, the polymerization inhibitor having a phenolic hydroxy group is preferably at least one compound selected from the group consisting of 2,2'-methylene bis(6-tert-butyl-p-cresol), 2,2'-methylene bis(4-ethyl-6-tert-butylphenol), 2,2'-methylene bis(4-methyl-6-tert-butylphenol)monoacrylate, 2,2'-ethylene bis(4,6-di-tert-amylphenol) monoacrylate, and 2,2'-methylene bis(6-(1-methylcyclohexyl)-p-cresol), from the viewpoint of storage stability.

The curable-type composition of the present invention may include one of the polymerization inhibitor singly or two or more thereof.

The content of the polymerization inhibitor in the curable-type composition of the present invention is preferably from 0.01 parts by mass to 20 parts by mass, more preferably from 0.05 parts by mass to 10 parts by mass, and particularly preferably from 0.1 parts by mass to 5 parts by mass, with respect to the content of the methylene malonate compound of 100 parts by mass, from the viewpoint of storage stability.

Other Components

The curable-type composition of the present invention may further include other components depending on its use. For example, an anionic polymerizable compound other than the methylene malonate compound, a radically polymerizable compound, a photopolymerization initiator other than the photo base generator, a solvent, an anionic polymerization promoter, a plasticizer, a thickener, a sensitizer, an adhesion-imparting agent (such as a silane coupling agent) or the like may be contained.

Further, examples of other additives include a filler, a pigment, a dye, a leveling agent, a defoamer, an antistatic agent, an ultraviolet absorber, a pH adjuster, a dispersant, a dispersion aid, a surface modifier, a plasticizing promoter, an anti-dripping agent, a curing promoter, a viscoelasticity adjuster, an antibacterial agent, a fluorescent brightener, and an antioxidant. These can be used singly or in combination of two or more thereof.

The other anionic polymerizable compound is not particularly limited as long as the effect of the present invention can be exhibited. Examples thereof include a cyanoacrylate such as 2-ethylcyanoacrylate and a polymerizable epoxy compound (for example, a compound having two or more glycidyl groups, such as bisphenol A diglycidyl ether).

The radically polymerizable compound is not particularly limited as long as the effect of the present invention can be exhibited. Examples thereof include a (meth)acrylate compound and a (meth)acrylamide compound.

The curable-type composition of the present invention may contain a polymerization initiator for assisting or promoting curing and, in the case of including a radically polymerizable compound, preferably further includes a radical polymerization initiator and more preferably further includes a photo radical generator.

As the photo radical generator, a known photo radical generator used for photo polymerization of a radically polymerizable compound can be used.

Examples of the photo radical generator include an acylgerman-based compound, an acylphosphine oxide-based compound, an acetophenone-based compound that has no hydroxy group, nitrogen atom, and thioether bond, and a benzoin-based compound at has no hydroxy group, nitrogen atom, and thioether bond.

Among them, an acylgerman-based compound is preferable as the photo radical generator, from the viewpoint of photo curability, adhesion rate, and storage stability.

Examples of the acylgerman compound preferably include a monoacylgerman-based compound and a bisacylgerman-based compound, and more preferably include a bisacylgerman-based compound.

Examples of the acylgerman-based compound preferably include Tvocelin (manufactured by Ivoclar Vivadent).

Examples of the acylphosphine oxide-based compound preferably include a monoacylphosphine oxide-based compound and a bisacylphosphine oxide-based compound, and more preferably include a bisacylphosphine oxide-based compound.

The curable-type composition of the present invention may include one of the photo radical generator singly or two or more thereof.

The content of the polymerization initiator in the curable-type composition of the present invention is preferably from 0.01% by mass to 5% by mass, more preferably from 0.05% by mass to 2% by mass, and particularly preferably from 0.05% by mass to 1% by mass, with respect to the total solid content of the curable-type composition, from the viewpoint of photo curability and storage stability.

The solvent is not particularly limited as long as the effect of the present invention can be exhibited, Examples thereof include: an aromatic hydrocarbon-based solvent, such as benzene, toluene, and xylene; a saturated hydrocarbon-based solvent, such as hexane, cyclohexane, and heptane; an ether-based solvent, such as diethyl ether, diisopropyl ether, tetrahydrofuran, dioxane, ethylene glycol monomethyl ether, and propylene glycol monomethyl ether; a ketone-based solvent, such as acetone, methyl ethyl ketone, and methyl isobutyl ketone; an ester-based solvent, such as ethyl acetate, butyl acetate, and propylene glycol monomethyl ether acetate; and a halogenated hydrocarbon-based solvent, such as chloroform. These can be used singly or in combination of two or more thereof.

When the solvent is included in the curable-type composition, the content of the solvent is preferably from 1 parts by mass to 1,000 parts by mass, more preferably from 1 parts by mass to 500 parts by mass, and particularly preferably from 1 parts by mass to 300 parts by mass, with respect to the content of the methylene malonate compound of 100 parts by mass.

Examples of the anionic polymerization promoter include polyalkylene oxides, crown ethers, sila-crown ethers, calixarenes, cyclodextrins, and pyrogallol-based cyclic compounds. Polyalkylene oxides are polyalkylene oxides and derivatives thereof, examples of which include those disclosed in JP-A No. S60-37836, JP-A No. H01-43790, JP-A No. S63-128088, JP-A No. H03-167279, U.S. Pat. Nos. 4,386,193, and 4,424,327. Specific examples thereof include (1) polyalkylene oxides, such as diethylene glycol, triethylene glycol, polyethylene glycol, and polypropylene glycol, and (2) derivatives of polyalkylene oxides, such as a polyethylene glycol monoalkyl ester, a polyethylene glycol dialkyl ester, a polypropylene glycol dialkyl ester, a diethylene glycol monoalkyl ether, diethylene glycol dialkyl ether, dipropylene glycol monoalkyl ether, and dipropylene glycol dialkyl ether. Examples of the crown ethers include those disclosed in JP-A No. S55-2236 and JP-A No. H03-167279. Specific examples include 12-crown-4, 15-crown-5, 18-crown-6, benzo-12-crown-4, benzo-15-crown-5, benzo-18-crown-6, dibenzo-18-crown-6, dibenzo-24-crown-8, dibenzo-30-crown-10, tribenzo-18-crown-6, asymdibenzo-22-crown-6, dibenzo-14-crown-4, dicyclohexyl-24-crown-8, cyclohexyl-12-crown-4, 1,2-decalyl-15-crown-5, 1,2-naphtho-15-crown-5, 3,4,5-naphthyl-16-crown-5, 1,2-methylbenzo-18-crown-6, 1,2-tert-butyl-18-crown-6, and 1,2-vinylbenzo-15-crown-5. Examples of the sila-crown ethers include those disclosed in JP-A No. 560-168775, Specific examples thereof include dimethylsila-11-crown-4, dimethylsila-14-crown-5, and dimethylsila-17-crown-6. Examples of the calixarenes include those disclosed in JP-A No. S60-179482, JP-A No. S62-235379, and JP-A No. S63-88152. Specific examples thereof include 5,11,17,23,29,35-hexa-tert-butyl-37,38,39,40,41,42-hexahydrooxycalix[6]arene, 37,38,39, 40,41,42-hexahydrooxycalix[6]arene, 37,38,39,40,41,42-hexa-(2-oxo-2-ethoxy)-ethoxycalix[6]arene, 25,26,27,28-tetra-(2-oxo-2-ethoxy)-ethoxycalix[4]arene, and tetrakis(4-t-butyl-2-methylenephenoxy)ethyl acetate. Examples of the cyclodextrins include those disclosed in JP-A No. H05-505835. Specific examples thereof include $\alpha$-, $\beta$-, or $\gamma$-cyclodextrin. Examples of the pyrogallol-based cyclic compounds include compounds disclosed in JP-A No. 2000-191600. Specific examples thereof include 3,4,5,10,11,12,17,18,19,24,25,26-dodecaethoxycarbomethoxy-C-1, C-8, C-15, C-22-tetramethyl[14]metacyclophane. These anionic polymerization promoters may be used singly, or in combination of two or more thereof.

The plasticizer can be contained as long as the effect of the present invention is not impaired.

Examples of the plasticizer include triethyl acetyl citrate, tributyl acetyl citrate, dimethyl adipate, diethyl adipate, dimethyl sebacate, dimethyl phthalate, diethyl phthalate, dibutyl phthalate, diisodecyl phthalate, dihexyl phthalate, diheptyl phthalate, dioctyl phthalate, bis(2-ethylhexyl) phthalate, diisononyl phthalate, diisotridecyl phthalate, dipentadecyl phthalate, dioctyl terephthalate, diisononyl isophthalate, decyl toluate, bis(2-ethylhexyl)camphorate, 2-ethylhexylcyclohexylcarboxylate, diisobutyl fumarate, diisobutyl maleate, triglyceride caproate, 2-ethylhexyl benzoate, and dipropylene glycol dibenzoate. Among them, tributyl acetyl citrate, dimethyl adipate, dimethyl phthalate, 2-ethylhexyl benzoate, and dipropylene glycol dibenzoate are preferable from the viewpoint that compatibility with the 2-cyanoacrylic acid ester is favorable and plasticization efficiency is high. These plasticizers may be used singly, or in combination of two or more thereof.

The content of the plasticizer is not particularly limited, but is preferably from 3 parts by mass to 50 parts by mass, more preferably from 10 parts by mass to 45 parts by mass, and further preferably from 20 parts by mass to 40 parts by mass, when the content of the methylene malonate compound is 100 parts by mass. When the content of the plasticizer is from 3 parts by mass to 50 parts by mass, the retention rate of adhesive strength after cold heat resistance cycle test can be improved.

Further, examples of the thickener include polymethyl methacrylate, a copolymer of methyl methacrylate with an acrylic acid ester, a copolymer of methyl methacrylate with another methacrylic acid ester, acrylic rubber, polyvinyl chloride, polystyrene, cellulose ester, a polyalkyl-2-cyanoacrylic acid ester, and an ethylene-vinyl acetate copolymer. These thickeners may be used singly, or in combination of two or more thereof.

The curable-type composition of the present invention may also include a fumed silica as a filler or the like.

The fumed silica is an anhydrous silica of an ultrafine powder (preferably having a primary particle diameter of 500 nm or less, particularly preferably from 1 nm to 200 nm). The anhydrous silica is, for example, an anhydrous silica of an ultrafine powder (preferably having a primary particle diameter of 500 nm or less, particularly preferably from 1 nm to 200 nm) that is produced due to oxidation, using silicon tetrachloride as a raw material, in a gas phase state in a high-temperature flame, examples of the anhydrous silica including a hydrophilic silica with high hydrophilicity and a hydrophobic silica with high hydrophobicity. Any of these can be used as the fumed silica, but a hydrophobic silica is preferable from the viewpoint that dispersion ability in the methylene malonate compound is favorable.

As the hydrophilic silica, various commercially available products can be used, and examples thereof include Aerosil 50, 130, 200, 300 and 380 (these are trade names and manufactured by Nippon Aerosil Co., Ltd.). The specific surface areas of these hydrophilic silicas are $50\pm15$ m$^2$/g, $130\pm25$ m$^2$/g, $200\pm25$ m$^2$/g, $300\pm30$ m$^2$/g, and $380\pm30$ m$^2$/g, respectively. Further, as commercially available hydrophilic silica, Leoloseal QS-10, QS-20, QS-30, and QS-40 (these are trade names and manufactured by Tokuyama Corporation) and the like can be used. The specific surface areas of these hydrophilic silicas are $140\pm20$ m$^2$/g, $220\pm20$ m$^2$/g, $300\pm30$ m$^2$/g, and $380\pm30$ m$^2$/g, respectively. In addition, commercially available hydrophilic silicas manufactured by CABOT can also be used.

Further, as the hydrophobic silica, a product can be used which is produced by bringing, into contact with a hydrophilic silica under the presence or absence of a solvent, a compound that may react with a hydroxy group present on the surface of the hydrophilic silica to form a hydrophobic group or a compound that may be adsorbed to the surface of the hydrophilic silica to form a hydrophobic layer on the surface, and preferably heating, to treat the surface of the hydrophilic silica.

Examples of the compounds that are used for surface-treating and hydrophobizing the hydrophilic silica include: various alkyl, aryl, or aralkyl-based silane coupling agents having hydrophobic groups, such as n-octyltrialkoxysilane; silylating agents, such as methyltrichlorosilane, dimethyldichlorosilane, and hexamethyldisilazane; silicone oils, such as polydimethylsiloxane; higher alcohols, such as stearyl alcohol; and higher fatty acids, such as stearic acid. As the hydrophobic silica, a product that has been hydrophobized with any compound may be used.

Examples of commercially available hydrophobic silica include Aerosil RY200 and R202, each of which has been surface-treated with a silicone oil to be hydrophobized, Aerosil R974, R972. and R976, each of which has been surface-treated with a dimethylsilylating agent to be hydrophobized, Aerosil R805, which has been surface-treated with n-octyitrimethoxysiiane to be hydrophobized, Aerosil R811 and R812, each of which has been surface-treated with a trimethylsilylating agent to be hydrophobized (these are trade names and manufactured by Nippon Aerosil Co., Ltd.), and Leolosil MT-10, which has been surface-treated with methyltrichlorosilane to be hydrophobized (this is a trade name and manufactured by Tokuyama Co., Ltd.). The specific surface areas of these hydrophobic silicas are $100\pm20$ m$^2$/g, $100\pm20$ m$^2$/g, $170\pm20$ m$^2$/g, $110\pm20$ m$^2$/g, $250\pm25$ m$^2$/g, $150\pm20$ m$^2$/g, $150\pm20$ m$^2$/g, $260\pm20$ m$^2$/g, and $120\pm10$ m$^2$/g, respectively.

The preferred content of the fumed silica in the curable-type composition of the present invention is from 1 parts by mass to 30 parts by mass, when the content of the methylene malonate compound is 100 parts by mass. The preferred content of the fumed silica depends on the type of the methylene malonate compound, the type of the fumed silica, and the like, but is from 1 parts by mass to 25 parts by mass and particularly preferably from 2 parts by mass to 20 parts by mass. Falling within the range above makes it possible to configure an adhesive composition that is also favorable in workability.

Method of Producing Curable-Type Composition

The method of producing the curable-type composition of the present invention is not particularly limited, and the composition may be produced by mixing the respective components described above. The components are preferably mixed under an atmosphere of no or little moisture and oxygen (for example, 0.01% by volume or less), and more preferably mixed under an inert gas atmosphere.

Examples of the inert gas include nitrogen and argon.

Further, it is preferable that the method of producing the curable-type composition of the present invention is carried out under light shielding.

The mixing method is not particularly limited, and a known mixing method can be used therefor.

Method of Storing Curable-Type Composition

The curable-type composition of the present invention may be stored by a known storage method and, for example, is preferably stored under an atmosphere of no or little moisture and oxygen (for example, 0.01% by volume or less) or stored in a sealed container, and more preferably stored under an inert gas atmosphere or stored in a sealed container.

Examples of the inert gas include nitrogen and argon.

Further, it is preferable that the curable-type composition of the present invention is stored under light shielding.

Method of Curing Curable-Type Composition

The method of curing the curable-type composition of the present invention is not particularly limited as long as it allows polymerization curing of the methylene malonate compound. The curable-type composition may be cured by water such as moisture or may be cured by light, but is preferably cured by water such as moisture.

When the curable-type composition of the present invention is cured by light, the curable-type composition can be cured by irradiating it with ultraviolet rays or visible light using a high-pressure mercury lamp, a halogen lamp, a xenon lamp, an LED (light emitting diode) lamp, sunlight, or the like.

Use

The curable-type composition of the present invention can be used for known curable-type compositions.

For example, it can be suitably used as a so-called instantaneous adhesive.

Since the curable-type composition of the present invention has photocurability and dark part curability, and is excellent in storage stability, it can be used in a wide range of fields such as general use, industrial use, and medical use.

Examples thereof include, but are not limited to, an adhesive, a coating agent (such as a protective coating agent), a printing ink (such as an inkjet ink), a photoresist, and a sealant.

Specifically, for example, it can be suitably used for coating, or for adhesion or fixing between the same or different kinds of articles, such as sealing of electronic parts, attachment of reel sheets or threading guides on fishing rods, fixing of wirings such as coils, fixing of magnetic heads to pedestals, fillers used for tooth treatment, and adhesion or decoration of artificial nails.

Method of Producing Adhered Product Using Curable-Type Composition

The curable-type composition of the present invention can be preferably used for the first embodiment of the method of producing an adhered product of the present invention indicated below.

The first embodiment of the method of producing an adhered product of the present invention includes: a step of applying the curable-type composition of the present invention to a surface of a first adherend (hereinafter, also referred to as a "curable-type composition applying step"); a step of affixing the surface of the first adherend, to which the curable-type composition has been applied, to a second adherend (hereinafter, also referred to as a "first affixing step"); and a step of irradiating the curable-type composition between the first adherend and the second adherend with light from a side of an adherend having light transparency, in which at least one of the first adherend or the second adherend is the adherend having light transparency (hereinafter, also referred to as a "first light irradiating step").

Further, the curable-type composition of the present invention is capable of dark part curing even without light irradiation, and the method of producing an adhered product of the present invention may be a method without light irradiation.

Further, in the first embodiment of the method of producing an adhered product of the present invention, the curable-type composition of the present invention may be applied to only the surface of the first adherend, or may be applied to both the surface of the first adherend and the surface of the second adherend.

Further, the first adherend and the second adherend may be different adherends from each other, or may be the same adherend as each other. Accordingly, an embodiment is possible in which an adhesive is applied to one surface of the first adherend, and affixed to be adhered to another surface of the same first adherend.

The shape of the surface of the first adherend and the surface of the second adherend, which are affixed to each other, is not particularly limited, and may be any shape such as a flat surface, a recessed surface, and an irregularly shaped surface.

Examples of the material of the adherend include plastic, rubber, wood, metal, inorganic material, and paper.

Specific examples of the plastic include polyvinyl alcohol, a cellulose acetate resin such as triacetyl cellulose and diacetyl cellulose, an acrylic resin, polyethylene terephthalate, a polycarbonate, a polyarylate, a polyether sulfone, a cyclic polyolefin resin derived from, as a monomer, a cyclic olefin such as norbornene, polyvinyl chloride, an epoxy resin, and a polyurethane resin.

Specific examples of the rubber include natural rubber and styrene-butadiene rubber (SBR).

Specific examples of the wood include natural wood and synthetic wood.

Specific examples of the metal include a steel plate, a metal such as aluminum and chromium, and a metal oxide such as zinc oxide (ZnO) and indium tin oxide (ITO).

Specific examples of the inorganic material include glass, mortar, concrete, and stone.

Specific examples of the paper include high-qualify paper, coated paper, art paper, imitation paper, thin paper, thick paper, and various synthetic papers.

In the case of the first embodiment of the method of producing an adhered product of the present invention, at least one of the first adherend or the second adherend is used as an adherend having light transparency.

Further, in the curable-type composition applying step, there is no particular limitation on the method of applying the curable-type composition to the surface of the first adherend.

Examples of the applying method include: a method of using an applying tool such as a brush, a spatula, a cotton swab, a roller, and a spray; and a method of coating using a coating machine such as a bar coater, an applicator, a doctor blade, a dip coater, a roll coater, a spin coater, a flow coater, a knife coater, a comma coater, a reverse roll coater, a die coater, a lip coater, a spray coater, a gravure coater, a microgravure coater, and a dispenser.

Then, the second adherend is affixed to the applied surface of the first adherend.

The curable-type composition is irradiated with light from a side of an adherend having light transparency to be cured, in which at least one of the first adherend or the second adherend is the adherend having light transparency.

In photocuring, a base is generated from the photo base generator in response to light, and the methylene malonate compound is anionically polymerized to be cured, by which the surface of the first adherend and the surface of the second adherend are adhered to each other.

Preferred examples of the light to be irradiated in the photocuring include ultraviolet rays. Examples of the irradiation light source of the ultraviolet rays include a low-pressure mercury lamp, a medium-pressure mercury lamp, a high-pressure mercury lamp, an ultra-high-pressure mercury lamp, a xenon lamp, and a metal halide lamp. In addition, examples include an ultraviolet device (UV-LED) using a light emitting diode as a light source and a laser beam in an ultraviolet region.

In the dark part curing, the Lewis acidic compound acts on the methylene malonate compound, and the methylene malonate compound is cured by moisture or the like in the air, by which the surface of the first adherend and the surface of the second adherend are adhered to each other.

When the surface of the first adherend and the surface of the second adherend are overlapped with each other, at least one of the surface of the first adherend or the surface of the second adherend may be moved, if necessary.

Further, in the first embodiment, the curing is possible even at room temperature (for example, from 10° C. to 35° C.), but at least one of the surface of the first adherend or the surface of the second adherend or the adherend may be heated in order to promote the curing. For the purpose of promoting the dark reaction, it is preferable to heat after the light irradiating step.

The curing may be done by heating to a temperature range that does not affect the adherend, for example, from about 35° C. to about 100° C.

In the first embodiment, if necessary, each of the surface of the first adherend and the surface of the second adherend may be pressed in a direction along which they overlap with each other until adhesion by the curing is completed.

Two-Component Curable-Type Composition Set

The two-component curable-type composition set of the present invention includes a composition A that includes a methylene malonate compound and a photo base generator, and a composition B that includes a Lewis acidic compound.

For example, curing and adhesion can be done by: applying the composition A and the composition B to the surface of the adherend (preferably applying the composition A and the composition B to the surface of one adherend to be adhered), or applying the composition A to the surface of one adherend to be adhered and applying the composition B to the surface of the other adherend; if necessary removing the solvent; and overlapping the surfaces of the two adherends with each other.

The preferred embodiment of the methylene malonate compound and the preferred embodiment of the photo base generator in the composition A and the preferred embodiment of the Lewis acidic compound in the composition B in the two-component curable-type composition set of the present invention are the same as the preferred embodiment of the methylene malonate compound, the preferred embodiment of the photo base generator, and the preferred embodiment of the Lewis acidic compound in the curable-type composition of the present invention described above, except as described below, respectively.

Further, the composition A and the composition B in the two-component curable-type composition set of the present invention may each independently include at least one of the polymerization inhibitor described above or the other components described above.

The preferred embodiments of the polymerization inhibitor and the other components in the two-component curable-type composition set of the present invention are the same as the preferred embodiments of the polymerization inhibitor and the other components in the curable-type composition of the present invention described above, respectively.

The composition B may further include a photo base generator.

The content of the methylene malonate compound in the composition A is preferably from 10% by mass to 99.9% by mass, preferably from 30% by mass to 99.5% by mass, further preferably from 50% by mass to 99.5% by mass, and particularly preferably from 90% by mass to 99% by mass, with respect to the total solid content of the composition A.

The content of the photo base generator in the composition A is preferably from 0.01% by mass to 30% by mass, more preferably from 0.1% by mass to 15% by mass, further preferably from 0.2% by mass to 10% by mass, and particularly preferably from 0.5% by mass to 5% by mass, with respect to the total solid content of the composition A.

The content of the Lewis acidic compound in the composition B is preferably from 1% by mass to 100% by mass, more preferably from 10% by mass to 100% by mass, and particularly preferably from 50% by mass to 100% by mass, with respect to the total solid content of the composition B.

The composition B preferably includes a solvent. Preferred examples of the solvent include those described above in the curable-type composition of the present invention.

The content of the solvent in the composition B is preferably from 10% by mass to 99.99% by mass, more preferably from 50% by mass to 99.9% by mass, and particularly preferably from 80% by mass to 99% by mass, with respect to the total mass of the composition B.

Further, the two-component curable-type composition set of the present invention may include a composition other than the composition A and the composition B or an article.

The composition other than the composition A and the composition B is not particularly limited, but examples thereof include a liquid for cleaning the surface of tine adherend to which at least one of the composition A or the composition B is applied, and a liquid for removing the cured product of the composition A and the composition B.

The article is not particularly limited, but examples thereof include: an application tool for applying the composition A or the composition B, such as a brush, a spatula, a cotton swab, a roller, and a spray and a removing tool for removing an extra part of the composition A and the composition B, such as paper and cloth.

Method of Producing Adhered Product Using Two-Component Curable-Type Composition Set The second embodiment of the method of producing an adhered product of the present invention, which is a method of producing an adhered product using the two-component curable-type composition set of the present invention, includes: a step of applying a composition B that includes a Lewis acidic compound to a surface of a first adherend; a step of applying a composition A that includes a methylene malonate compound and a photo base generator, to the surface of the first adherend or a surface of a second adherend; a step of affixing the surface of the first adherend to which the composition B has been applied, to the surface of the second adherend to which the composition A has been applied, or affixing the surface of the first adherend to which the composition A and the composition B have been applied, to the surface of the second adherend; and a step of irradiating the curable-type composition between the first adherend and the second adherend with light from a side of an adherend having light transparency, in which at least one of the first adherend or the second adherend is the adherend having light transparency.

The preferred embodiments of the composition A and the composition B in the second embodiment of the method of producing an adhered product of the present invention are the same as the preferred embodiments of the composition A and the composition B in the two-component curable-type composition set of the present invention described above, respectively.

Composition B-Applying Step and Composition A-Applying Step

The second embodiment of the method of producing an adhered product of the present invention includes: a step of applying a composition B that includes a Lewis acidic compound to a surface of a first adherend (also referred to as a "composition B-applying step"); and a step of applying a composition A that includes a methylene malonate compound and a photo base generator, to the surface of the first adherend or a surface of a second adherend (also referred to as a "composition A-applying step").

Either the composition B-applying step or the composition A-applying step may be carried out first, or the steps may be carried out simultaneously.

Further, in the second embodiment of the method of producing an adhered product of the present invention, both the composition A and the composition B may be applied to a surface of one adherend (the surface of the first adherend), and the composition A and the composition B may be applied to or at least one of the composition A or the composition B may be applied to a surface of the other adherend (the surface of the second adherend). Alternatively, the composition A may be applied to a surface of one adherend (the surface of the first adherend) and the composition B may be applied to a surface of the other adherend (the surface of the second adhered).

Further, the surface of the first adherend and the surface of the second adherend may be surfaces of parts of different adherends, respectively, or may be surfaces of two places where they can be adhered in one adherend, respectively.

The shape of the surface of the first adherend and the surface of the second adherend is not particularly limited, and may be any shape such as a flat surface, a recessed surface, and an irregularly shaped surface.

The application amount of the composition A in the composition A-applying step is not particularly limited, may be any amount as long as it enables adhesion, and can be appropriately selected as desired.

Further, after the composition A is applied, the solvent may be removed by air drying, heat drying, or the like, if necessary.

The application amount of the composition B in the composition B-applying step is not particularly limited, may be any amount as long as it enables adhesion, and the application amount of the Lewis acidic compound that is included in the composition B is preferably from 0.001 parts by mass to 1.0 parts by mass, more preferably from 0.001 parts by mass to 0.5 parts by mass, and particularly preferably from 0.001 parts by mass to 0.1 parts by mass, with respect to the application amount, of 100 parts by mass, of the methylene malonate compound in the composition A that is applied in the composition A-applying step.

Further, after the composition B is applied, the solvent may be removed by air drying, heat drying, or the like, if necessary.

The application method used in the composition B-applying step and the composition A-applying step is not particularly limited, and the composition B or the composition A can be applied, by a known method, to the surface of the first adherend or the surface of the second adherend.

Second Affixing Step

The second embodiment of the method of producing an adhered product of the present invention includes a step of affixing the surface of the first adherend to which the composition B has been applied, to the surface of the second adherend to which the composition A has been applied, or affixing the surface of the first adherend to which the composition A and the composition B have been applied, to the surface of the second adherend (hereinafter, also referred to as a "second affixing step").

In the second affixing step, the surface of the first adherend and the surface of the second adherend may be overlapped to be affixed to each other.

Further, in the second photocuring step, photocuring, dark part curing, or both photocuring and dark part curing of the methylene malonate compound is possible.

Second Light Irradiating Step

The second embodiment of the method of producing an adhered product of the present invention includes a step of irradiating the curable-type composition between the first adherend and the second adherend with light from a side of an adherend having light transparency, in which at least one of the first adherend or the second adherend is the adherend having light transparency (also referred to as a "second light irradiating step").

In photocuring, a base is generated from the photo base generator in response to light, and the methylene malonate compound is anionically polymerized to be cured, by which the surface of the first adherend and the surface of the second adherend are adhered to each other.

Further, as to the first adherend and the second adherend, only one of the first adherend or the second adherend may be the adherend having light transparency, or both the first adherend and the second adherend may be the adherend having light transparency.

Preferred examples of the light to be irradiated in the photocuring include ultraviolet rays. Examples of the irradiation light source of the ultraviolet rays include those that are the same as described above.

In the dark part curing, the Lewis acidic compound that is included in the composition B acts on the methylene malonate compound that is included in the composition A, and the methylene malonate compound is cured by moisture or the like in the air, by which the surface of the first adherend and the surface of the second adherend are adhered to each other.

When the surface of the first adherend and the surface of the second adherend are overlapped with each other, at least one of the surface of the first adherend or the surface of the second adherend may be moved to promote the mixing of the composition A and the composition B, if necessary.

Further, in the second embodiment, the curing is possible even at room temperature (for example, from 10° C. to 35° C.), but at least one of the surface of the first adherend or the surface of the second adherend or the adherend may be heated in order to promote the curing. For the purpose of promoting the dark reaction, it is preferable to heat after the light irradiating step.

The curing may be done by heating to a temperature range that does not affect the adherend, for example, from about 35° C. to about 100° C.

In the second embodiment, if necessary, each of the surface of the first adherend and the surface of the second adherend may be pressed in a direction along which they overlap with each other until adhesion by the curing is completed.

The adherend that is adhered by the curable-type composition of the present invention, the two-component curable-type composition set of the present invention, or the method of producing an adhered product of the present invention is not particularly limited. The adherend may be an inorganic compound, may be an organic compound, may be an inorganic-organic composite, may be the same material as each other, or may be different materials from each other. Further, the curable-type composition of the present invention, the two-component curable-type composition set of the present invention, or the method of producing an adhered product of the present invention enables those in the form of solid and any shape to be adhered.

Examples of the adherend include the material that is the same as described above.

EXAMPLES

Hereinafter, the present invention will be more specifically described based on examples, The present invention is not limited to these examples. Hereinafter, "parts" and "%" mean "parts by mass" and "% by mass", respectively, unless otherwise specified.

Preparation of Diethyl Methylene Malonate

Diethyl methylene malonate (hereinafter, also referred to as "DEMM"), produced in accordance with the following literature, was used. Purity: 99% by mass or more (from $^1$H-NMR).

Journal of the Chemical Society of Japan, 1972, No. 3, pp 596 to 598

Comparative Example 1

Photocuring

200 µL of DEMM was poured into a cylindrical hole having a diameter φ of 8 mm and a depth of 5 mm made of a polypropylene sheet having a thickness of 10 mm, and was irradiated with ultraviolet rays from above at an accumulated light amount of 3 J/cm$^2$ (ultraviolet measuring instrument (UV Power Puck), UV-C, manufactured by Heraeus) by an ultraviolet irradiation device (SUV-16: manufactured by AS ONE).

After irradiation, 2 μL of methanesulfonic acid and deuterated chloroform were added to terminate the polymerization.

For the obtained cured product, the reaction rate of DENIM was measured by $^1$H-NMR (manufactured by Bruker), and the weight average molecular weight (Mw) was measured by gel permeation chromatography (GPC, HPLC8021 manufactured by Tosoh Corporation, eluent: chloroform).

Dark Part Curing

Two (2) drops (about 5 mg) of DENIM were dropped on a copper test piece (a prism having a bottom surface of 12.7 mm×12.7 mm), and another test piece was affixed thereto. After affixing, the time until the weight of 2.586 kg could be lifted by the adhesion test piece was made as a set time, and recorded up to 30 minutes.

Comparative Example 2

0.02 g of Zinc trifluoromethanesulfonate (hereinafter, also referred to as "Zn(OTf)$_2$"), which is a Lewis acid, was added to 2 mL of acetone and completely dissolved to obtain a Lewis acid catalyst solution.

After mixing 500 μL of the Lewis acid catalyst solution with 5 g of DEMM obtained in Synthesis Example 1, vacuum drying was performed to remove acetone derived from the Lewis acid catalyst solution, to obtain the composition of Comparative Example 2.

The obtained composition was used to be evaluated in the same manner as in Comparative Example 1. The results are shown in Table 1.

Comparative Example 3

0.0214 g of 9-anthrylmethyl N,N-diethyl carbamate (manufactured by Fujifilm Wako Pure Chemical Industries, Ltd., trade name WPBG-018, hereinafter also referred to as "WPBG"), which is a photo base generator, was mixed with 1.2 g of DENIM obtained in Synthesis Example 1, and stirred until completely dissolved, to obtain the composition of Comparative Example 3 (curable-type composition).

The obtained composition was used to be evaluated in the same manner as in Comparative Example 1. The results are shown in Table 1.

Example 1

0.0214 g of WPBG-018, which is a photo base generator, was mixed with 1.2 g of the composition obtained in Comparative Example 2, and stirred until completely dissolved, to obtain the composition of Example 1 (curable-type composition).

The obtained composition was used to be evaluated in the same manner as in Comparative Example 1. The results are shown in Table 1.

Example 2

The composition of Example 1 was used as the composition.

The same operations and evaluations as in Comparative Example 1 were performed, except for using the composition of Example 1 and changing the accumulated light amount to 6 J/cm$^2$. The results are shown in Table 1.

Example 3

The composition of Example 1 was used as the composition.

The same operations and evaluations as in Comparative Example 1 were performed, except for using the composition of Example 1 and changing the accumulated light amount to 9 J/cm$^2$. The results are shown in Table 1.

TABLE 1

|  |  | Comparative Example 1 | Comparative Example 2 | Comparative Example 3 | Example 1 | Example 2 | Example 3 |
|---|---|---|---|---|---|---|---|
| Composition | DEMM | 100 | 100 | 100 | 100 | 100 | 100 |
|  | Zn(OTf)$_2$ | — | 0.01 | — | 0.01 | 0.01 | 0.01 |
|  | WPBG | — | — | 1.78 | 1.78 | 1.78 | 1.78 |
| Photocuring | Accumulated light amount (J/cm$^2$) | 6 | 6 | 6 | 3 | 6 | 9 |
|  | Reaction rate (%) | 0 | 0 | 0 | 68 | 77 | 98 |
|  | Mw | — | — | — | 13,800 | 17,700 | 23,100 |
| Dark part curing | Set time (min) | >30 | 5 | >30 | 5 | 5 | 5 |

The numerical value of each component of the composition in Table 1 represents a mass ratio in the composition.

As shown in Table 1, the curable-type compositions of Examples 1 to 3 are capable of both photocuring and dark part curing.

On the other hand, as shown in Table 1, the curable-type composition of Comparative Example 1, which includes neither a Lewis acidic compound nor a photo base generator, and the curable-type composition of Comparative Example 3, which includes only a photo base generator without including a Lewis acid compound, were not photocured and were unsatisfactory in dark part curing. Further, the curable-type composition of Comparative Example 2, which includes only a Lewis acidic compound without including a photo base generator, was dark part-cured, but was not photocured.

The disclosure of Japanese Patent Application No. 2019-164835, filed Sep. 10, 2019, is incorporated herein by reference in its entirety.

All publications, patent applications, and technical standards described in present specification are herein incorporated by reference to the same extent as if each individual publication, patent application, or technical standard was specifically and individually indicated to be incorporated by reference.

What is claimed is:

1. A curable-type composition, comprising:
   a methylene malonate compound;
   a Lewis acidic compound; and
   a photo base generator.

2. The curable-type composition according to claim 1, wherein the methylene malonate compound is a compound represented by the following Formula (1) or Formula (2):

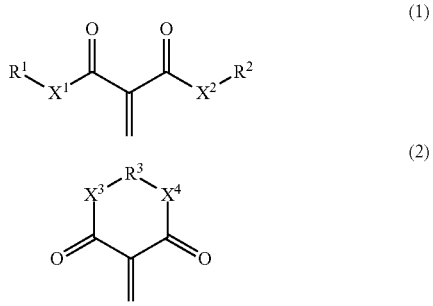

wherein, in Formula (1) and Formula (2), each of $X^1$ to $X^4$ independently represents O, NR, or $C(R)_2$, wherein each R independently represents a hydrogen atom, an alkyl group, or an aryl group, $R^1$ and $R^2$ each independently represent an alkyl group or an aryl group, and $R^3$ represents an alkylene group, an arylene group, or a group that is a combination of two or more thereof.

3. The curable-type composition according to claim 1, wherein the Lewis acidic compound comprises a Lewis acidic compound having a metal cation.

4. The curable-type composition according to claim 1, wherein the Lewis acidic compound comprises a Lewis acidic compound having at least one metal cation selected from the group consisting of $Fe^{2+}$, $Cu^{2+}$, $Zn^{2+}$, $Ag^+$, $Yb^{3+}$, and $Ti^{4+}$.

5. The curable-type composition according to claim 1, wherein the Lewis acidic compound comprises a Lewis acidic compound having at least one counter anion selected from the group consisting of a trifluoromethanesulfonic anion, a tert-butoxide anion, an acetylacetonate anion, a chloride ion, and a bromide ion.

6. The curable-type composition according to claim 1, wherein a content of the Lewis acidic compound is from 0.001 parts by mass to 1.0 part by mass with respect to a content of the methylene malonate compound of 100 parts by mass.

7. The curable-type composition according to claim 1, wherein each of $X^1$ to $X^4$ independently represents O or NR.

8. The curable-type composition according to claim 1, wherein each of $X^1$ to $X^4$ represents O.

9. The curable-type composition according to claim 1, wherein $R^1$ and $R^2$ each independently represent an alkyl group.

10. The curable-type composition according to claim 1, wherein $R^3$ represents an alkylene group.

11. The curable-type composition according to claim 1, the composition comprising the compound represented by Formula (1).

12. The curable-type composition according to claim 1, wherein the photo base generator comprises a compound that generates an amine compound in response to light.

13. A method of producing an adhered product, the method comprising:

applying the curable-type composition according to claim 1 to a surface of a first adherend;

affixing the surface of the first adherend, to which the curable-type composition has been applied, to a second adherend; and irradiating the curable-type composition between the first adherend and the second adherend with light from a side of an adherend having light transparency, wherein at least one of the first adherend or the second adherend is the adherend having light transparency.

14. A two-component curable-type composition set, comprising:

a composition A that comprises a methylene malonate compound and a photo base generator; and a composition B that comprises a Lewis acidic compound.

15. The two-component curable-type composition set according to claim 14, wherein the methylene malonate compound is a compound represented by the following Formula (1) or Formula (2):

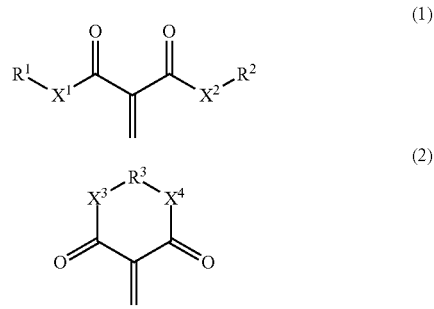

wherein, in Formula (1) and Formula (2), each of $X^1$ to $X^4$ independently represents O, NR, or $C(R)_2$, wherein each R independently represents a hydrogen atom, an alkyl group, or an aryl group, $R^1$ and $R^2$ each independently represent an alkyl group or an aryl group, and $R^3$ represents an alkylene group, an arylene group, or a group that is a combination of two or more thereof.

16. A method of producing an adhered product, the method comprising:

applying a composition B that comprises a Lewis acidic compound to a surface of a first adherend;

applying a composition A that comprises a methylene malonate compound and a photo base generator, to the surface of the first adherend or a surface of a second adherend;

affixing the surface of the first adherend to which the composition B has been applied, to the surface of the second adherend to which the composition A has been applied, or affixing the surface of the first adherend to which the composition A and the composition B have been applied, to the surface of the second adherend; and irradiating the curable-type composition between the first adherend and the second adherend with light from a side of an adherend having light transparency, wherein at least one of the first adherend or the second adherend is the adherend having light transparency.

17. The method of producing an adhered product according to claim 16, wherein the methylene malonate compound is a compound represented by the following Formula (1) or Formula (2):

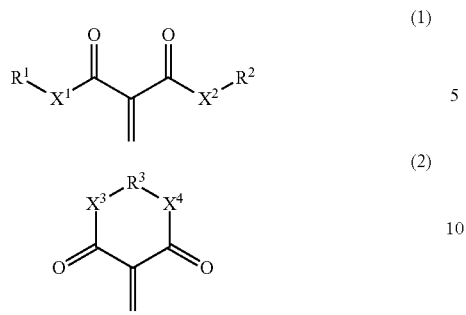
wherein, in Formula (1) and Formula (2), each of $X^1$ to $X^4$ independently represents O, NR, or $C(R)_2$, wherein each R independently represents a hydrogen atom, an alkyl group, or an aryl group, $R^1$ and $R^2$ each independently represent an alkyl group or an aryl group, and $R^3$ represents an alkylene group, an arylene group, or a group that is a combination of two or more thereof.
* * * * *